US008509728B2

(12) United States Patent
Mittal et al.

(10) Patent No.: US 8,509,728 B2
(45) Date of Patent: Aug. 13, 2013

(54) EMERGENCY CALL HANDLING IN A WIRELESS COMMUNICATION SYSTEM

(75) Inventors: Vineet Mittal, San Diego, CA (US); Bhupesh Manoharlal Umatt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 576 days.

(21) Appl. No.: 11/555,054

(22) Filed: Oct. 31, 2006

(65) Prior Publication Data

US 2008/0102784 A1    May 1, 2008

(51) Int. Cl.
 *H04B 1/16*    (2006.01)
(52) U.S. Cl.
 USPC ........................................ 455/404.1; 455/434
(58) Field of Classification Search
 USPC ............ 455/404.1, 404.2, 408, 434; 370/318
 See application file for complete search history.

(56) References Cited

U.S. PATENT DOCUMENTS

| | | | | |
|---|---|---|---|---|
| 5,043,736 A | * | 8/1991 | Darnell et al. | 342/357.1 |
| 5,235,633 A | * | 8/1993 | Dennison et al. | 455/456.3 |
| 5,327,144 A | * | 7/1994 | Stilp et al. | 342/387 |
| 6,223,044 B1 | * | 4/2001 | Schultz | 455/456.1 |
| 6,240,285 B1 | | 5/2001 | Blum et al. | |
| 6,847,822 B1 | * | 1/2005 | Dennison et al. | 455/456.1 |
| 7,197,312 B2 | * | 3/2007 | Gunaratnam et al. | 455/445 |
| 7,333,795 B2 | * | 2/2008 | Dorsey et al. | 455/404.1 |
| 2006/0094397 A1 | * | 5/2006 | Raghuram et al. | 455/404.1 |

FOREIGN PATENT DOCUMENTS

| | | | |
|---|---|---|---|
| GB | 2360176 A | * | 9/2001 |
| GB | 2416960 A | * | 2/2006 |

OTHER PUBLICATIONS

3GPP Technical Specification Group Radio Access Network; UE Procedures in Idle Mode and Procedures for Cell Reselection in Connection Mode (Release 5) CWTS STD-DS-25.304.*
3GPP 25-304 V7.0.0 (Mar. 2006) Release 7—UMTS UE procedures in idle mode and procedures for cell reselection in connected mode.*
International Search Report and Written Opinion—PCT/US2007/083056, International Search Authority—European Patent Office—Jun. 19, 2008.
Taiwan Search Report—TW096141059—TIPO—Feb. 22, 2011.
Taiwan Search Report—TW096141059—TIPO—Oct. 22, 2011.

* cited by examiner

*Primary Examiner* — Nizar Sivji
(74) *Attorney, Agent, or Firm* — Kenyon S. Jenckes; Ashish L. Patel

(57) ABSTRACT

This disclosure describes techniques for efficiently handling emergency calls in a wireless communication system. The techniques are executed in a wireless communication device (WCD) that is interoperable between radio access technologies (RATs). For example, the WCD may support interoperability between the Global System for Mobile Communications (GSM) and the Universal Terrestrial Radio Access Network (UTRAN). Typically, the emergency call is redirected to another RAT or frequency following an unsuccessful emergency call. However, instead of searching only suitable cells on which to place the emergency call, a WCD that implements the described techniques searches acceptable cells of any public land mobile network and attempts to place the emergency call on the cell with the highest power. By placing the emergency call on the cell with the highest power, the techniques reduce delay in placing emergency calls by reducing the number of attempts required before successfully placing the emergency call.

55 Claims, 4 Drawing Sheets

EMERGENCY CALL HANDLING IN A
WIRELESS COMMUNICATION SYSTEM

TECHNICAL FIELD

This disclosure relates to wireless communication and, more particularly, techniques for handling emergency calls in wireless communication systems.

BACKGROUND

Third generation (3G) wireless communication systems, such as the Universal Mobile Telecommunication System (UMTS), permit interoperability between radio access networks, such as the Global System for Mobile Communications (GSM) and the Universal Terrestrial Radio Access Network (UTRAN). For this reason, universal mobile telecommunication system (UMTS) user equipment (UE), such as mobile radiotelephones, can support multiple radio access technologies (RATs). For example, a UE may support communication using either Wideband Code Division Multiple Access (WCDMA) or GSM RATs, and thereby permit access to wireless communication services via network equipment associated with UTRAN or GSM cells.

For interoperability, the UE implements a process that controls selection and reselection of cells associated with both RAT types, i.e., inter-RAT cell reselection. As an illustration, when a mobile UE is in GSM idle mode, it may perform signal measurements of neighboring UTRAN cells. If the UE determines that one of the neighboring UTRAN cells has a stronger signal level than the serving and neighboring GSM cells, and the signal level satisfies a network-specified threshold, the UE selects the UTRAN cell for communication services.

UEs also implement special processes for handling emergency calls. These processes may utilize the interoperability capabilities of the UE. For example, when a UE is used to make an emergency call, such as a 911 phone call in the US or a 112 phone call in other countries, the UE may redirect the emergency call to a different RAT or frequency. For example, the UE may redirect the emergency call to a different frequency or RAT following an unsuccessful attempt at placing the emergency call using the current frequency. As another example, the UE may switch to a GSM mode to place the emergency call if it is not already operating in the GSM mode. The UE switches to the GSM in this case because the GSM mode provides location information that can be used to locate the UE, which may be helpful in an emergency situation, such as a situation in which the user is unable to communicate the location information to the emergency call handler.

However, the emergency call may be unsuccessful on the serving frequency or after being redirected to a different RAT or frequency because the network is unavailable from the cell and frequency on which the UE is operating. The network may be unavailable for various reasons, such as not being able to determine the location of the UE, congestion on the uplink or downlink channel due to heavy call traffic, and the network shutting down or being unavailable due to maintenance. Each failed attempt at placing the emergency call introduces a delay in placing the emergency call. Delay is undesirable because of the high priority of an emergency call.

SUMMARY

In general, this disclosure is directed to techniques for efficiently handling emergency calls in a wireless communication system. The techniques may be executed in a wireless communication device (WCD) that is interoperable between radio access technologies (RATs). For example, the WCD may support interoperability between the Global System for Mobile Communications (GSM) and the Universal Terrestrial Radio Access Network (UTRAN). When the initial emergency call is unsuccessful on the serving frequency, the emergency call is redirected to another RAT or frequency. Specifically, instead of searching only suitable cells on which to place the emergency call, the WCD searches acceptable cells of any public land mobile network (PLMN) and attempts to place the emergency call on the cell with the highest power. By placing the emergency call on the cell with the highest power, the techniques reduce delay in placing the emergency call by reducing the likelihood that multiple attempts will be required before successfully placing the emergency call.

In a conventional WCD that operates as a dual mode mobile radiotelephone, satellite radiotelephone, wireless networking card, or the like, the WCD redirects an emergency call to a different RAT or frequency when the emergency call is unsuccessful, i.e., does not go through, on the serving frequency. For example, when the WCD is operating in a wideband code-division multiple access (WCDMA) mode and the emergency call is unsuccessful, the WCD may switch to a GSM mode and retry the emergency call. In some cases, a WCD may immediately redirect the emergency call to GSM, if it is available, because GSM provides location information for locating the WCD. A WCD operating in a GSM mode typically does not redirect the emergency call to WCDMA. However, when operating in a GSM or WCDMA mode, the emergency call may be directed to a different frequency. In any case, a Radio Resource Control (RRC) Connection Reject message sent by the network in response to the initial emergency call contains the redirection information for the emergency call.

Upon receiving the RRC Connection Reject message, the WCD attempts to place the emergency call in accordance with the specified destination RAT or frequency. In particular, WCD searches for a suitable cell on which to place the call. A suitable cell is a cell on which the WCD can obtain normal service, as defined by the third generation partnership project (3GPP) technical specification (TS) 25.304. However, no suitable cell may be available because the WCD may not be within range of any suitable cells or the suitable cells may be congested or otherwise unable to accept any incoming calls.

The WCD may continue to search for a suitable cell until expiration of a wait timer. If a suitable cell has not been found when the wait timer expires, the WCD may return to operating in the original mode and retry the emergency call on the serving frequency. The WCD will continue to retry placing the emergency call on the initial frequency or a different RAT or frequency until the emergency call is successful. However, searching for a suitable cell when the emergency call is unsuccessful introduces a delay as does retrying the emergency call on the original serving frequency. This delay is unacceptable due to the high priority of the emergency call.

A WCD that handles emergency calls in accordance with the techniques of this disclosure, however, may reduce this delay by increasing the probability that the emergency call will be successful, i.e., reducing the number of attempts before the emergency call is successful. In particular, the WCD places an emergency call by searching acceptable cells of any PLMN for the cell with the highest power and placing the emergency call on the cell with the highest power. An acceptable cell is a cell on which the WCD can obtain limited service, such as originate emergency calls, as defined by the 3GPP TS 25.304 specification. The power of cell may be determined by a measured signal value, such as the CPICH Ec/No value for a UTRAN cell, as discussed in GSM TS 05.08. The CPICH Ec/No value generally refers to the received energy per chip divided by the power density in the band of the received common pilot channel (CPICH) signal for the cell.

Placing the call on the acceptable cell with the highest power reduces the likelihood that the call will be dropped, for example, due to dynamic RF conditions. Additionally, searching acceptable cells, instead of suitable cells only, increases the number of cells available for placing the emergency call and, moreover, searching acceptable cells of any PLMN further increases the number of available cells. By increasing the number of available cells on which to place the emergency call and reducing the likelihood that the call will be dropped, the number of attempts for a successful emergency call is reduced thereby reducing the delay for placing the emergency call. The WCD may also reduce delay in placing an emergency call by not performing a location update.

In one embodiment, this disclosure is directed to a method for placing an emergency call by a subscriber of a service provider in a wireless communication network comprising scanning a plurality of acceptable cells, wherein the acceptable cells include cells of the service provider and additional cells from one or more other service providers, selecting a cell from the plurality of the acceptable cells, the selected cell having a highest power of the acceptable cells, and placing the emergency call on the selected cell.

In another embodiment, this disclosure is directed to an apparatus for placing an emergency call by a subscriber of a service provider in a wireless communication network, the apparatus comprising a scanning module that scans a plurality of acceptable cells, wherein the acceptable cells include cells of the service provider and additional cells from one or more other service providers, a cell selection module that selects a cell with a highest power from the plurality of acceptable cells, and an emergency call module that places the emergency call on the selected cell.

In an additional embodiment, this disclosure is directed to a processor of a wireless communication device for placing an emergency call by a subscriber of a service provider in a wireless communication network, the processor being configured to scan a plurality of acceptable cells in a wireless communication network, select a cell from the plurality of cells that has a highest power, and place an emergency call on the selected cell, wherein the acceptable cells include cells of the service provider and additional cells from one or more other service providers.

In a further embodiment, this disclosure is directed to an apparatus for placing an emergency call by a subscriber of a service provider in a wireless communication network comprising means for scanning a plurality of acceptable cells, wherein the acceptable cells include cells of the service provider and additional cells from one or more other service providers, means for selecting a cell from the plurality of the acceptable cells, the selected cell having a highest power of the acceptable cells, and means for placing the emergency call on the selected cell.

The techniques described in this disclosure may be implemented in hardware, software, firmware, or any combination thereof. If implemented in software, the techniques may be realized in part by a machine-readable medium comprising instructions that, when executed, performs one or more of the methods described herein. The techniques described in this disclosure may be implemented at least in part in circuitry, which may be embodied by a chip or chipset suitable for incorporation in a WCD. In some embodiments, the disclosure is directed to a WCD that incorporates such circuitry.

In yet another embodiment, this disclosure is directed to a machine-readable medium comprising instructions for placing an emergency call by a subscriber of a service provider in a wireless communication network. The instructions cause a programmable processor to scan a plurality of acceptable cells, wherein the acceptable cells include cells of the service provider and additional cells from one or more other service providers, select a cell from the plurality of the acceptable cells, the selected cell having a highest power of the acceptable cells, and place the emergency call on the selected cell.

The details of one or more embodiments of this disclosure are set forth in the accompanying drawings and the description below. Other features, objects, and advantages will be apparent from the description and drawings, and from the claims.

DETAILED DESCRIPTION

Figure 1:
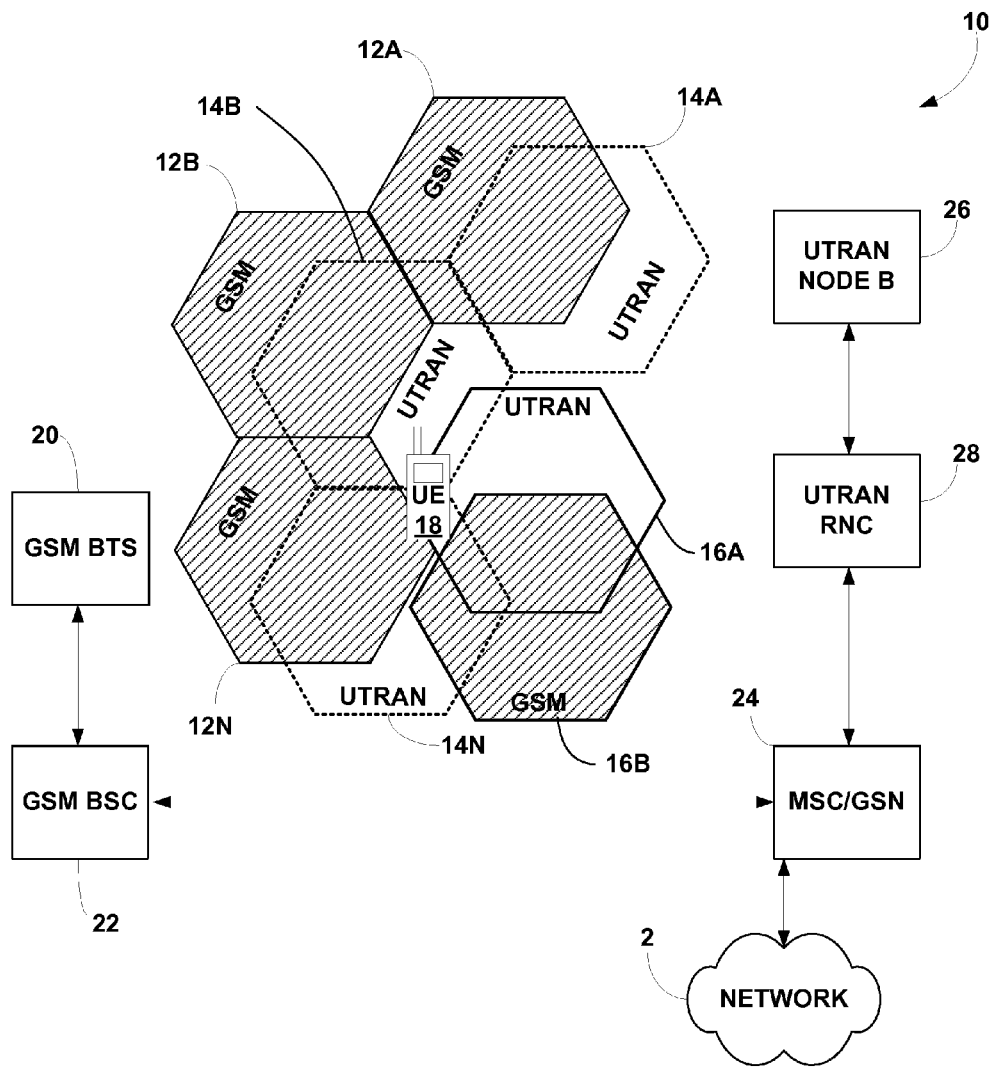
FIG. 1 is a block diagram illustrating a multi-RAT wireless communication system.

FIG. 1 is a block diagram illustrating a wireless communication system 10. Wireless communication system 10 may support multiple radio access technologies (RATs). As shown in FIG. 1, for example, wireless communication system 10 may include multiple Global System for Mobile Communications (GSM) cells 12A-12N, collectively referred to herein as "GSM cells 12," and multiple Universal Terrestrial Radio Access Network (UTRAN) cells 14A-14N, collectively referred to herein as "UTRAN cells 14," distributed across a geographic area. Wireless communication system 10 also includes UTRAN cell 16A and GSM cell 16B. UTRAN cell 16A and GSM cell 16B may overlap the same geographic area as GSM cells 12 and UTRAN cells 14 but are associated with a different service provider than GSM cells 12 and UTRAN cells 14.

During normal operation, a wireless communication device, e.g., user equipment (UE) 18, provides access to network equipment associated with selected GSM cells 12 and UTRAN cells 14 as UE 18 travels within the geographic area. UTRAN cell 16A and GSM Cell 16B are normally unavailable to UE 18 because cells 16A and 16B are operated by a different service provider than GSM cells 12 and UTRAN cells 14. UE 18 may take the form of a variety of different wireless communication devices, such as a mobile radiotelephone, satellite radiotelephone, wireless networking card, or the like. UE 18 offers support for two or more RATs, such as GSM and wideband code division multiple access (WCDMA) in the example of FIG. 1.

UE 18 is described in this disclosure as supporting WCDMA/GSM interoperability, however, interoperability between other RATs is conceivable. For example, UE 18 may support interoperability between any two or more different RATs. Other example RATs, include CDMA IS-95, CDMA 2000, and other CDMA technologies, frequency division multiple access (FDMA) technologies, time division multiple access (TDMA) technologies, evolution-data optimized (EV-DO), and WIFI technologies. Consequently, UE 18 may, for example, support GSM/CDMA IS-95 interoperability, GSM/CDMA 2000 interoperability, GSM/WIFI, or GSM/EV-DO interoperability.

GSM cells 12 and GSM cell 16A are coupled to a network 2 via respective GSM base transceiver stations (BTS) 20, GSM base station controllers (BSC) 22 and a UMTS mobile switching center (MSC)/GPRS (General Packet Radio System) Support Node (GSN) 24. UTRAN cells 14 and UTRAN cell 16A are coupled to network 2 via respective UTRAN node Bs 26, UTRAN radio network controllers (RNC) 28, and UMTS MSC/GSN 24. MSC/GSN 24 may provide a GGSN (Gateway GPRS Support Node) or an SGSN (Serving GPRS Support Node). Network 2 may provide interconnections to other networks, such as the public switched telephone network (PSTN) and the Internet. While operating within a geographic area, UE 18 normally accesses network 18 via GSM cells 12 and UTRAN cells 14. During operation, a user may operate UE 18 to place an emergency call.

Emergency calls, however, can be unsuccessful on the serving frequency or even after being redirected to a different RAT or frequency because network 2 is unavailable from the cell and frequency on which UE 18 is operating. Network 2 may be unavailable for various reasons, such as not being able to determine the location of UE 18, dynamic radio frequency (RF) conditions, congestion on the uplink or downlink channel due to heavy call traffic, and maintenance. When an emergency call fails, redirecting the emergency call to another RAT or frequency requires some period of time. The delay introduced by a failed attempt at placing an emergency call is undesirable because of the high priority of the emergency call.

In accordance with this disclosure, UE 18 is configured to promote efficient handling of emergency calls. Specifically, in order to place an emergency call, UE 18 scans acceptable cells of any public land mobile network (PLMN) for the acceptable cell with the highest power and places the emergency call on the selected cell. That is, UE 18 is not limited to placing the emergency call only on suitable cells. Instead, UE 18 may place the emergency call on acceptable cells associated with the service provider for UE 18 as well as acceptable cells associated with other service providers.

A suitable cell is a cell on which UE 18 can obtain normal service, as defined by the third generation partnership project (3GPP) technical specification (TS) 25.304. A suitable cell fulfills certain requirements. These requirements include that the cell is not barred according to subclause 5.3.1.1 of the 3GPP TS 25.304 specification, the cell selection criteria are fulfilled according to subclause 5.2.3.1.2 of the 3GPP TS 25.304 specification, the cell is part of the selected public land mobile network (PLMN) or a PLMN considered equivalent by UE 18, and the cell is not part of the list of forbidden location areas (LAs) for roaming according to 3GPP TS 22.011.

In contrast, an acceptable cell, as defined by the 3GPP TS 25.304 specification is a cell on which UE 18 can obtain limited service, such as originate emergency calls. More specifically, an acceptable cell fulfills certain requirements. These requirements are less restrictive than those associated with a suitable cell. These requirements include that the cell is not barred in accordance with subclause 5.3.1.1 of the 3GPP TS 25.304 specification and that cell selection criteria are fulfilled in accordance with subclause 5.2.3.1.2 of the 3GPP TS 25.304 specification. Thus, by scanning cells of any PLMN that satisfy the requirements of an acceptable cell, UE 18 can select the cell with the highest power from a greater number of cells. As a result, the likelihood that the emergency call is unsuccessful, for example, due to dynamic RF conditions, is reduced.

With respect to FIG. 1, for example, GSM cells 12A, 12B and UTRAN cells 14A, 14B may be suitable cells and GSM cell 12N and UTRAN cell 14N may be acceptable cells. As previously described, UTRAN cell 16A and GSM cell 16B are associated with a different service provider than the service provider for UE 18. Accordingly, UTRAN cell 16A and GSM cell 16B are characterized as acceptable cells on a different PLMN. In this case, UE 18 can operate only on GSM cells 12A, 12B and UTRAN cells 14A, 14B during normal operation.

For example, UE 18 may be camped on UTRAN cell 14A when an emergency number is dialed on UE 18. When the emergency number is dialed, UE 18 may send a Radio Resource Control (RRC) Connection Request message to UTRAN cell 14A. However, the emergency call may be unsuccessful because UTRAN cell 14A may be unavailable on the serving frequency due to changing RF conditions, network congestion, or network maintenance/shutdown. In this case, UTRAN cell 14A sends a RRC Connection Reject message that contains redirection information to UE 18.

UE 18 redirects the emergency call according to information contained in the RRC Connection Reject message. For inter-RAT redirection, the RRC Connection Reject message includes the destination RAT and a wait timer. For inter-frequency redirection, the RRC Connection Reject message includes the destination frequency and a wait timer. The wait timer specifies the period of time before UE 18 retries the emergency call on the initial serving frequency. The wait period may, for example, be approximately 1 to 15 seconds. At expiration of the wait period, network 2 may be less congested and, thus, be able to accept the emergency call. However, because of the high priority of the emergency call, it is not desirable for UE 18 to remain idle during the wait period. For this reason, the emergency call is redirected to a different RAT or frequency during the wait period instead of remaining idle.

Redirection of the emergency call and, thus, the information provided in the RRC Connection Reject message may be controlled according to a set of defined rules or criteria. As an example, the emergency call may be preferably redirected to GSM or a different frequency of GSM when GSM cells are available. However, when there are no GSM cells available, the emergency call may be redirected to a different frequency of WCDMA. In this manner, the emergency call can be redirected to another RAT or frequency, i.e., a frequency different than the serving frequency, during the wait period when the UE is operating in a GSM or a WCDMA mode.

In the event that the redirection information includes a destination RAT, UE 18 scans GSM cells 12 and GSM cell 16B to determine which cell has the highest power. In general, UE 18 performs a power scan over acceptable cells of any PLMN, and attempts to acquire the cell with the highest power, i.e., strongest signal, before attempting to acquire weaker cells. It is desirable to select the cell with the highest power because the RRC Connection Request message is less likely to be "dropped" due to dynamic RF conditions. Dropping the RRC Connection Request message further delays the emergency call because UE 18 must try to acquire the cell with the next highest power if the RRC Connection Request message is dropped. If UE 18 does not find a suitable cell before the wait timer expires, UE 18 retries the emergency call on the initial serving frequency. In the case that the emergency call is still unsuccessful, the emergency call may be again redirected to a different RAT or frequency further delaying the emergency call. UE 18 reduces the likelihood of this occurring by scanning acceptable cells of any PLMN for the cell with the highest power and placing the emergency call on the cell with the highest power.

Scanning only suitable cells, which are a subset of acceptable cells as defined in the 3GPP TS 25.304 specification, or any other subset of cells on which an emergency call can be placed may result in failing to identify the cell with the highest power. Using FIG. 1 as an example, scanning only suitable cells, GSM cells 12A, 12B in this case, may result in determining that GSM cell 12B has the highest power even though GSM cell 12B is weaker than GSM cell 16B. This is undesirable because placing an emergency call on GSM cell 12B, instead of GSM cell 16B, is more likely to be unsuccessful thereby unnecessarily delaying the emergency call.

In FIG. 1, UE 18 may determine the power of a cell using a measured signal value, such as the common pilot channel (CPICH) Ec/No value for a UTRAN cell, as discussed in GSM TS 05.08. The CPICH Ec/No value generally refers to the received energy per chip divided by the power density in the band of the received CPICH signal for the cell. In the event that GSM cell 16B has the highest power, even though GSM cell 16B is characterized as an acceptable cell on a PLMN other than the PLMN associated with the service provider for UE 18, UE 18 attempts to camp on GSM cell 16B. If UE 18 successfully camps on or acquires GSM cell 16B, UE 18 sends a RRC Connection Request message to GSM cell 16B.

UE 18 may also be configured to avoid performing a location update procedure when placing the emergency call. The location update procedure provides the cell with location information for UE 18. However, the location update procedure is not required to place an emergency call. Thus, the location update procedure may be skipped in order to further reduce the delay incurred when placing the emergency call.

Figure 2:
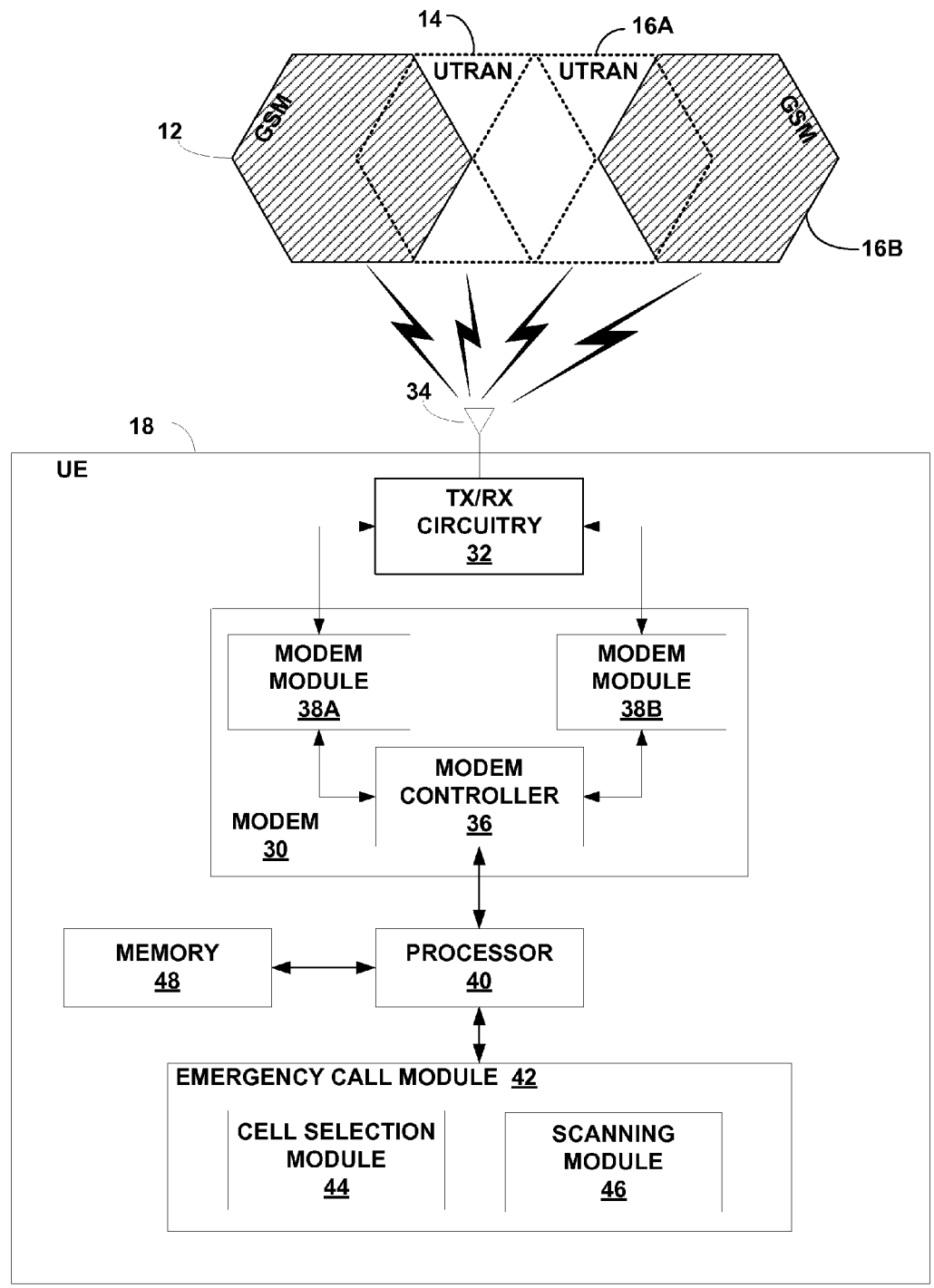
FIG. 2 is a block diagram illustrating a wireless communication device for use in the system of FIG. 1 to handle emergency calls in accordance with an embodiment of this disclosure.

FIG. 2 is a block diagram illustrating an example wireless communication device in the form of UE 18 for use in system 10 of FIG. 1. As shown in FIG. 2, UE 18 may include a processor 40 that interacts with a modem 30 to control wireless communication via transmit/receive (TX/RX) circuitry 32 and radio frequency antenna 34. Modem 30 may include a modem controller 36 and modem modules 38A and 38B, collectively referred to herein as "modem modules 38." Modem modules 38 permit communication according to different RAT types, such as GSM and WCDMA. In particular, modem controller 36 transitions between modem modules 38 depending on the type of RAT associated with the cell presently selected from GSM cells 12, UTRAN cells 14, UTRAN cell 16A, and GSM cell 16B.

In operation, processor 40 invokes emergency call module 42 following an unsuccessful emergency call. More specifically, processor 40 may invoke emergency call module 42 in response to receiving a RRC Connection Reject message. Emergency call module 42 implements the described techniques for efficient handling of emergency calls. In other words, emergency call module 40 enables UE 18 to select the cell with the highest power from GSM cells 12, UTRAN cells 14, UTRAN cell 16A, and GSM cell 16B, and place an emergency call on the selected cell, even though the cell with the highest power may be characterized as an acceptable on the PLMN of UE 18 or a different PLMN.

As shown in FIG. 2, emergency call module 42 includes cell selection module 44 and scanning module 46. Processor 40, modem 30, emergency call module 42, cell selection module 44, and scanning module 46 may take the form of a microprocessor, digital signal processor (DSP), application specific integrated circuit (ASIC), field programmable gate array (FPGA), or other logic circuitry programmed separately or together or may be otherwise configured to operate as described herein. Accordingly, modem modules 38 may take the form of programmable features executed by a common processor or discrete hardware units.

Scanning module 46 scans GSM cells 12, UTRAN cells 14, UTRAN cell 16A, and GSM cell 16B under the control of emergency control module 42. For example, emergency call module 42 may direct scanning module 46 to scan only GSM cells 12 and GSM cell 16B when the received RRC Connection Reject message indicates GSM as the destination RAT. Emergency call module 42 may also direct scanning module 46 to scan only GSM cells 12 and GSM cell 16B when the redirection information of the RRC Connection Reject messages specifies a GSM destination frequency. As another example, emergency call module 42 may direct scanning module 46 to scan only UTRAN cells 14 and UTRAN cell 16B when the redirection information contained in the received RRC Connection Reject message specifies a WCDMA destination frequency.

In any case, scanning module 46 may perform a power scan over the frequency spectrum for the appropriate cells. As an example, scanning module 46 may perform signal strength measurements for each of the cells that mach the redirection information. The measured signal strength may be the common pilot channel (CPICH) Ec/No value discussed in the 3GPP TS 25.304 specification, although other signal strength measurements, such as a received signal strength indication measurement, are conceivable. The CPICH Ec/No value generally refers to the received energy per chip divided by the power density in the band of the received CPICH signal.

Cell selection module 44 evaluates the signal measurement for each of the cells and selects the cell with the highest power, i.e., signal strength. Emergency call module 42 interacts with modem 30 to send a RRC Connection Request message to the selected cell via TX/RX circuitry 32 and radio frequency antenna 34. In the event that the emergency call is unsuccessful, cell selection module 44 progressively selects the cell with the next highest power and again interacts with modem 30 to send a RRC Connection Request message until the emergency call is successful or the wait timer expires. The wait timer is specified in the redirection information and stored in memory 48. Memory 48 may comprise, for example, random access memory (RAM) such as synchronous dynamic random access memory (SDRAM), read-only memory (ROM), non-volatile random access memory (NVRAM), electrically erasable programmable read-only memory (EEPROM), FLASH memory, or any combination of such devices.

When the wait timer expires, emergency call module 42 interacts with modem 30 to send a RRC Connection Request message on the initial serving frequency. However, because of the efficient emergency call handling techniques implemented by UE 18, the likelihood that the emergency call is not successful before the wait timer expires is reduced. In fact, by increasing the number of cells on which the emergency call can be placed and placing the call on the cell with the highest power, UE 18 can reduce the delay incurred when placing an emergency call. The delay is reduced because the likelihood that multiple attempts at placing the emergency call before it is successful is reduced.

Figure 3:
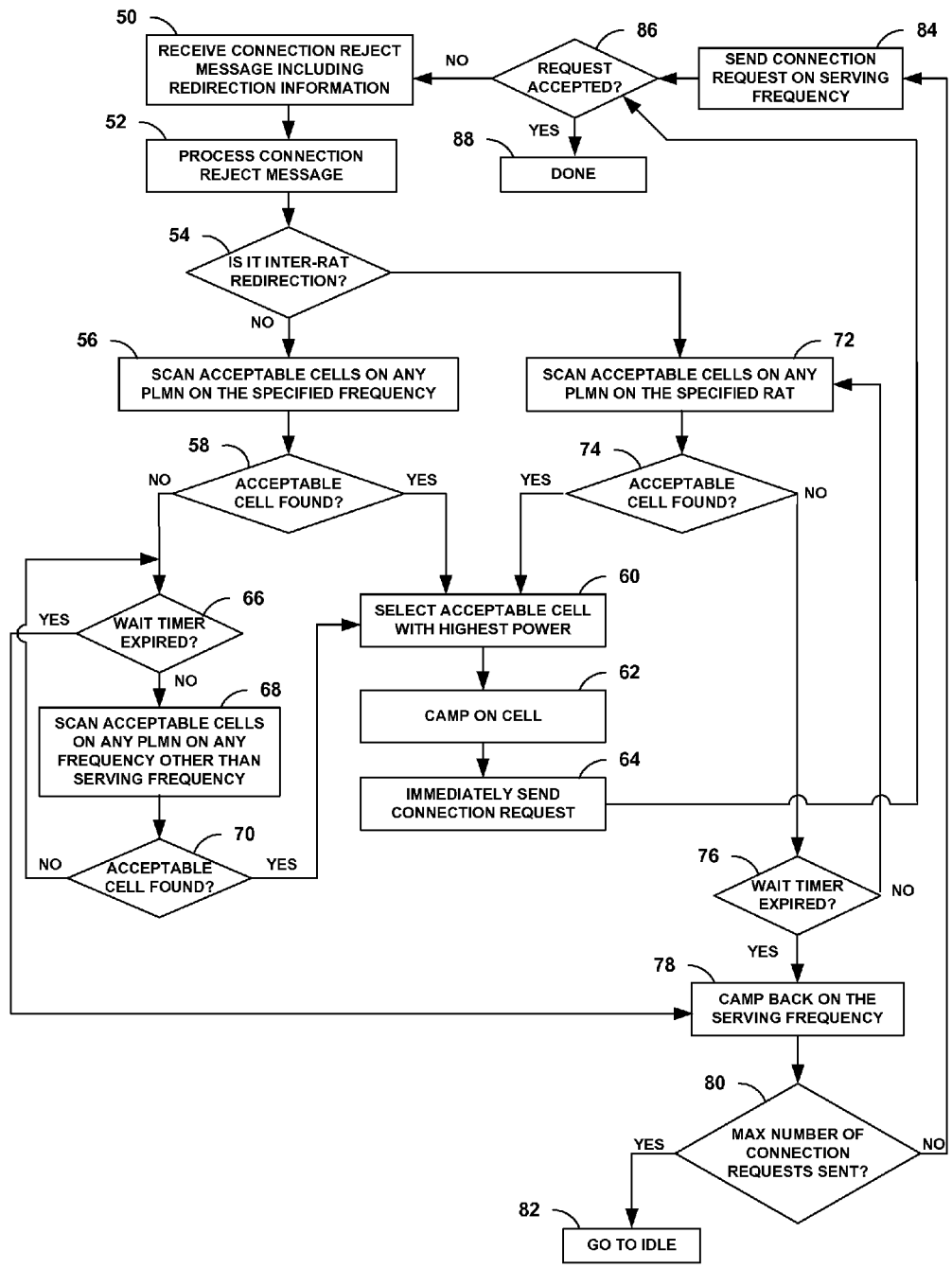
FIG. 3 is a flow chart illustrating an exemplary emergency call handling technique.

FIG. 3 is a flow chart illustrating an exemplary technique for handling emergency calls in a wireless communication system. The emergency call handling technique may be performed within UE 18. The flowchart begins with UE 18 receiving a RRC Connection Reject message (50). UE 18 may receive the RRC Connection Reject message after unsuccessfully placing the emergency call to the cell on which it is camped on the initial serving frequency. UE 18 processes the RRC Connection Reject message (52) to retrieve the redirection information contained in the message. UE 18 determines if the redirection information specifies inter-RAT redirection (54) or inter-frequency redirection.

If the redirection information specifies a destination frequency (no branch of decision block 54), UE 18 scans acceptable cells on any PLMN on the specified frequency (56). In particular, scanning acceptable cells on any PLMN on the specified frequency may involve performing a signal strength measurement for each of the scanned cells. As previously described, the signal measurement may be the CPICH Ec/No signal value. With respect to FIG. 1 and using UE 18 operating in a WCDMA mode as an example, UE 18 scans UTRAN cells 14 and UTRAN cell 16A.

When UE 18 finds an acceptable cell (yes branch of decision block 58), UE 18 selects the cell with the highest power (60), attempts to camp on the cell (62), and immediately sends a RRC Connection Request message to the selected cell (64) on the specified frequency. In fact, UE 18 may avoid performing a location update procedure, as previously described, in order to further reduce the delay incurred when placing the emergency call. In any case, if the cell accepts the RRC Connection Request message (yes branch of decision block 86), the emergency call is successful and the flow is done (88). However, if the RRC Connection Request message is not accepted (no branch of decision block 86), the flowchart restarts, i.e., UE 18 receives a RRC Connection Reject message (50).

When UE 18 does not find an acceptable cell (no branch of decision block 58), UE 18 determines if the wait timer has expired (66). The wait timer is included in the redirection information along with the specified frequency or RAT. If the wait timer has not expired (no branch of decision block 66), UE 18 scans acceptable cells on any frequency other than serving frequency (68) in order to try to find an acceptable on which to place the emergency call. If UE 18 is still unable to find an acceptable cell (no branch of decision block 70), UE 18 repeats steps 66, 68, and 70 until the wait timer is expired or an acceptable cell is found.

In the event that UE 18 finds an acceptable cell (yes branch of decision block 70), UE 18 completes steps 60, 62, 64, and 86 as described above. However, in the event that the UE 18 does not find an acceptable cell (no branch of decision block 70) and wait timer expires (yes branch of decision block 66), UE 18 camps back on the initial serving frequency (78) and determines if the maximum number of RRC Connection Request messages have been sent (80). If the maximum number of messages have been sent (yes branch of decision block 80), UE 18 enters an idle mode (82). In idle mode, UE 18 may display a message to the operator indicating that the emergency call failed. In this case, the operator may dial the emergency number again. However, if the maximum number of messages have not been sent (no branch of decision block 80), UE 18 sends a RRC Connection Request message on the initial serving frequency to the cell on which UE 18 is originally camped. If the cell accepts the RRC Connection Request message (yes branch of decision block 86), the emergency call is successful and the flow is done (88). If the RRC Connection Request message is not accepted (no branch of decision block 86), the flowchart restarts, i.e., UE 18 receives a RRC Connection Reject message (50).

Returning to the event that the redirection information specifies a destination RAT (yes branch of decision block 54), UE 18 scans acceptable cells on any PLMN on the specified RAT (72). In this case, if UE 18 is operating in a WCDMA mode, UE 18 scans GSM cells 12 and GSM cell 16B by performing a signal strength measurement for each of the cells.

If UE 18 finds an acceptable cell (yes branch of decision block 74), UE 18 selects the acceptable cell with the highest power (60), even if the selected cell is an acceptable cell on the PLMN for the service provider or is an acceptable on a PLMN for a different service provider. After selecting the cell, UE 18 attempts to camp on the cell (62) and immediately sends a RRC Connection Request message to the selected cell (64). If the RRC Connection Request message is accepted (yes branch of decision block 86), the flow is done (88). However, if the message is rejected, e.g., due to dynamic RF conditions or congestion from heavy network traffic, UE 18 receives a RRC Connection Reject message (50) and flow continues.

However, if UE 18 does not find an acceptable cell (no branch of decision block 74), UE 18 determines if the wait timer, specified in the RRC Connection Reject message received in step 50, is expired (76). When the wait timer has not expired (no branch of decision block 76), UE 18 repeats steps 72, 74, and 76 until an acceptable cell is found or the wait timer expires. The preceding paragraph describes the flow when an acceptable cell is found.

When the wait timer expires (yes branch of decision block 76), UE 18 camps back on the serving frequency (78) for the initial RAT, i.e., WCDMA in this case. UE 18 then goes to an idle mode (82) if the maximum number of RRC Connection Request messages have been sent (yes branch of decision block 80), or sends another RRC Connection Request message on the serving frequency (84). Again, the flow is done (88) if the RRC Connection Request message is accepted (yes branch of decision block 86), but the flow continues at step 50 if the message is rejected (no branch of decision block 86).

Figure 4:
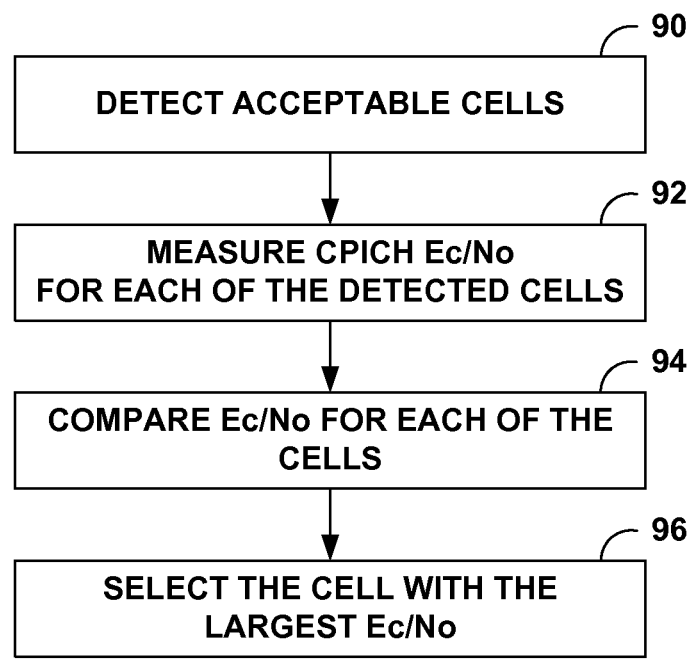
FIG. 4 is a flow chart illustrating an exemplary technique for selecting an acceptable cell with the highest power in accordance with the emergency call handling technique in FIG. 3.

FIG. 4 is a flow chart illustrating an exemplary cell selection technique of FIG. 3 in greater detail. The cell selection technique may be performed within UE 18 when an emergency call is redirected to a different RAT or frequency. The flow chart begins when UE 18 detects acceptable cells (90). As previously described, UE 18 detects acceptable cells of any PLMN when the emergency call is redirected to another RAT or frequency. In particular, when the emergency call is redirected to a different frequency, UE 18 detects acceptable cells of any PLMN on the redirected frequency. For example, when UE 18 is operating in a WCDMA mode, UE 18 detects UTRAN cells 14 and UTRAN cell 16A, but when UE 18 is operating in a GSM mode, UE 18 detects GSM cells 12 and GSM cell 16B. However, when the emergency call is redirected to a different RAT, UE 18 detects acceptable cells of any PLMN on the specified RAT. In this case, when UE 18 operates in a WCDMA mode, UE 18 detects GSM cells 12 and GSM cell 16A and detects UTRAN cells 14 and UTRAN cell 16A when operating in a WCDMA mode.

Upon detecting the cells in this manner, UE 18 measures the CPICH Ec/No signal value for each of the detected cells (92). UE 18 may conceivably measure other power parameters or signal strength values. Next, UE 18 compares the Ec/No signal value for each of the cells (94) and selects the cell with the largest Ec/No value (96).

The techniques described herein may be implemented in hardware, software, firmware, or any combination thereof. Any features described as modules or components may be implemented together in an integrated logic device or separately as discrete but interoperable logic devices. If implemented in software, the techniques may be realized in part by a machine-readable medium, such as a memory, comprising instructions stored thereon that, when executed, performs one or more of the methods described above. In this case, the machine-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The instructions may be executed by one or more machines, such as one or more processors, DSPs, general purpose microprocessors, ASICs, FPGAs, or other equivalent integrated or discrete logic circuitry. The term "processor," as used herein may refer to any of the foregoing structure or any other structure suitable for implementation of the techniques described herein. In some embodiments, the functionality described herein may be provided within dedicated software modules or hardware modules incorporated in a wireless communication device.

Various embodiments have been described. For example, techniques for efficiently handling redirected emergency calls in a wireless communication system have been described. The techniques include searching acceptable cells of any PLMN for the cell with the highest power and that satisfies the redirection information, and placing the emergency call on the cell with the highest power. Placing the call on the acceptable cell with the highest power reduces the likelihood that the call will be dropped, for example, due to dynamic RF conditions. Additionally, searching acceptable cells, instead of only suitable cells, increases the number of cells available for placing the emergency call and, moreover, searching acceptable cells of any PLMN further increases the number of available cells. By increasing the number of available cells on which to place the emergency call and reducing the likelihood that the call will be dropped, the number of attempts for a successful emergency call is reduced thereby reducing the delay for placing the emergency call. The WCD may also reduce delay in placing an emergency call by not performing a location update.

The techniques have been described in the context of a WCD that is interoperable between WCDMA and GSM, but may be applicable for devices that are interoperable between other RATs, such as CDMA IS-95, CDMA 2000, and other CDMA technologies, FDMA technologies, TDMA technologies, EV-DO, and WIFI technologies. These and other embodiments are within the scope of the following claims.

The invention claimed is:

1. A method of using a user equipment (UE) for reducing delay in placing an emergency call by a subscriber of a service provider in a wireless communication network, the method comprising:
   the UE scanning a plurality of acceptable cells, wherein the acceptable cells include cells of the service provider and additional cells from one or more other service providers;
   the UE selecting a cell from the plurality of the acceptable cells, the selected cell having a highest power of the acceptable cells; and
   the UE placing the emergency call on the selected cell, wherein the selecting the cell comprises acquiring the cell without ever performing a location update to place the emergency call, wherein the delay is reduced by reducing a number of failed attempts in placing the emergency call.

2. The method of claim 1, wherein selecting the cell includes transitioning wireless communication service from a first cell operating according to a first radio access technology (RAT) to the selected cell operating according to a second RAT different from the first RAT, and wherein placing the emergency call includes placing the call according to the second RAT.

3. The method of claim 2, wherein the first radio access technology is a code-division multiple access (CDMA) technology and the second radio access technology is global system for mobile communications (GSM) technology.

4. The method of claim 2, wherein the first RAT is global system for mobile communications (GSM) and the second RAT is wideband code-division multiple access (WCDMA).

5. The method of claim 1, wherein selecting the cell includes transitioning wireless communication service from a first cell operating on a first frequency to the selected cell operating on a second frequency different from the first frequency, and wherein placing the emergency call includes placing the emergency call on the second frequency.

6. The method of claim 1, wherein the service provider is a first service provider, wherein selecting the cell includes transitioning wireless communication service from a first cell associated with the first service provider to the selected cell associated with a second service provider different from the first service provider, and wherein placing the emergency call includes placing the call on the selected cell associated with the second service provider.

7. The method of claim 1, wherein scanning the plurality of acceptable cells comprises measuring a power parameter for each of the acceptable cells, and wherein selecting the cell from the plurality of acceptable cells with the highest power comprises selecting the cell with the greatest measurement for the power parameter.

8. The method of claim 7, wherein the power parameter comprises a common pilot channel (CPICH) Ec/No value representing a received energy per chip divided by a power density in a band of a received CPICH signal.

9. The method of claim 1, wherein the acceptable cells are associated with a plurality of service providers and each of the acceptable cells satisfy criterion for placing an emergency call in accordance with a third generation partnership project (3GPP) technical specification (TS) 25.304, versions 0.1.1 through 7.0.0.

10. The method of claim 1, wherein placing the emergency call comprises sending a connection request for placing the emergency call to the selected cell.

11. The method of claim 1, further comprising receiving a connection reject message in response to sending a connection request message for placing the emergency call on a first cell, and wherein scanning the plurality of acceptable cells comprises scanning the plurality of acceptable cells in response to receiving the connection reject message.

12. A user equipment apparatus configured for reducing delay in placing an emergency call by a subscriber of a service provider in a wireless communication network, the apparatus comprising:
   a scanning module that scans a plurality of acceptable cells, wherein the acceptable cells include cells of the service provider and additional cells from one or more other service providers;
   a cell selection module that selects a cell with a highest power from the plurality of acceptable cells; and
   an emergency call module that places the emergency call on the selected cell, wherein the cell selection module acquires the cell without ever performing a location update to place the emergency call, wherein the delay is reduced by reducing a number of failed attempts in placing the emergency call.

13. The apparatus of claim 12, wherein the cell selection module transitions wireless communication service from a first cell operating according to a first radio access technology (RAT) to the selected cell operating according to a second RAT different from the first RAT, and wherein the emergency call module places the emergency call on the selected cell according to the second RAT.

14. The apparatus of claim 13, wherein the first radio access technology is code-division multiple access (CDMA) technology and the second radio access technology is global system for mobile communications (GSM) technology.

15. The apparatus of claim 13, wherein the first RAT is global system for mobile communications (GSM) technology and the second RAT is a code-division multiple access (CDMA) technology.

16. The apparatus of claim 12, wherein the cell selection module transitions wireless communication service from a first cell operating on a first frequency to the selected cell operating on a second frequency different from the first frequency, and wherein the emergency call module places the emergency call on the selected cell on the second frequency.

17. The apparatus of claim 12, wherein the service provider is a first service provider, wherein the cell selection module transitions wireless communication service from a first cell associated with a first service provider to the selected cell associated with a second service provider different from the first service provider, and wherein the emergency call module places the emergency call on the selected cell associated with the second service provider.

18. The apparatus of claim 12, wherein the scanning module measures a power parameter for each of the acceptable cells, and wherein the cell selection module selects the cell from the plurality of acceptable cells with the greatest measurement for the power parameter.

19. The apparatus of claim 18, wherein the power parameter comprises a common pilot channel (CPICH) Ec/No value representing a received energy per chip divided by a power density in a band of a received CPICH signal.

20. The apparatus of claim 12, wherein the acceptable cells are associated with a plurality of service providers and each of the acceptable cells satisfy criterion for placing an emergency call in accordance with a third generation partnership project (3GPP) technical specification (TS) 25.304, versions 0.1.1 through 7.0.0.

21. The apparatus of claim 12, wherein the emergency call module sends a connection request message to the selected cell to place the emergency call.

22. The apparatus of claim 12, further comprising a receiver that receives a connection reject message in response to the emergency call module sending a connection request message for placing the emergency call on a first cell, and wherein the scanning module scans the plurality of acceptable cells in response to the receiver receiving the connection reject message.

23. A processor in a wireless communication user equipment device for reducing delay in placing an emergency call by a subscriber of a service provider in a wireless communication network, the processor being configured to:
    scan a plurality of acceptable cells in a wireless communication network,
    select a cell from the plurality of cells that has a highest power, and
    place an emergency call on the selected cell, wherein the acceptable cells include cells of the service provider and additional cells from one or more other service providers, and wherein the processor acquires the cell without ever performing a location update to place the emergency call, wherein the delay is reduced by reducing a number of failed attempts in placing the emergency call.

24. The processor of claim 23, wherein the processor transitions wireless communication service from a first cell operating according to a first radio access technology (RAT) to the selected cell operating according to a second RAT different from the first RAT, and places the emergency call on the selected cell according to the second RAT.

25. The processor of claim 24, wherein the first radio access technology is a code-division multiple access (CDMA) technology and the second radio access technology is a global system for mobile communications (GSM) technology.

26. The processor of claim 24, wherein the first RAT is a global system for mobile communications (GSM) technology and the second RAT is a code-division multiple access (CDMA) technology.

27. The processor of claim 23, wherein the processor transitions wireless communication service from a first cell operating on a first frequency to the selected cell operating on a second frequency different from the first frequency, and places the emergency call on the selected cell on the second frequency.

28. The processor of claim 23, wherein the processor transitions wireless communication service from a first cell associated with a first service provider to the selected cell associated with a second service provider different from the first service provider, and places the emergency call on the selected cell associated with the second service provider.

29. The processor of claim 23, wherein the processor measures a power parameter for each of the acceptable cells, and selects the cell from the plurality of acceptable cells with the greatest measurement for the power parameter.

30. The processor of claim 29, wherein the power parameter comprises a common pilot channel (CPICH) Ec/No value representing a received energy per chip divided by a power density in a band of a received CPICH signal.

31. The processor of claim 23, wherein the acceptable cells are associated with a plurality of service providers and each of the acceptable cells satisfy criterion for placing an emergency call in accordance with a third generation partnership project (3GPP) technical specification (TS) 25.304, versions 0.1.1 through 7.0.0.

32. The processor of claim 23, wherein the processor sends a connection request message to the selected cell to place the emergency call.

33. The processor of claim 23, wherein the processor is further configured to receive a connection reject message in response to sending a connection request message for placing the emergency call on a first cell, and scans the plurality of acceptable cells in response to receiving the connection reject message.

34. A non-transitory machine-readable medium in a user equipment, the machine-readable medium comprising instructions for reducing delay in placing an emergency call by a subscriber of a service provider in a wireless communication network, the instructions causing the user equipment to:
    scan a plurality of acceptable cells, wherein the acceptable cells include cells of the service provider and additional cells from one or more other service providers;
    select a cell from the plurality of the acceptable cells, the selected cell having a highest power of the acceptable cells; and
    place the emergency call on the selected cell, wherein the selecting the cell comprises acquiring the cell without ever performing a location update to place the emergency call, wherein the delay is reduced by reducing a number of failed attempts in placing the emergency call.

35. The non-transitory machine-readable medium of claim 34, wherein selecting the cell includes transitioning wireless communication service from a first cell operating according to a first radio access technology (RAT) to the selected cell operating according to a second RAT different from the first RAT, and wherein placing the emergency call includes placing the call according to the second RAT.

36. The non-transitory machine-readable medium of claim 35, wherein the first RAT is a code-division multiple access (CDMA) technology and the second RAT is a global system for mobile communications (GSM) technology.

37. The non-transitory machine-readable medium of claim 35, wherein the first RAT is a global system for mobile communications (GSM) technology and the second RAT is a code-division multiple access (CDMA) technology.

38. The non-transitory machine-readable medium of claim 34, wherein selecting the cell includes transitioning wireless communication service from a first cell operating on a first frequency to the selected cell operating on a second frequency different from the first frequency, and wherein placing the emergency call includes placing the emergency call on the second frequency.

39. The non-transitory machine-readable medium of claim 34, wherein the service provider is a first service provider, wherein selecting the cell includes transitioning wireless communication service from a first cell associated with a first service provider to the selected cell associated with a second service provider different from the first service provider, and wherein placing the emergency call includes placing the call on the selected cell associated with the second service provider.

40. The non-transitory machine-readable medium of claim 34, wherein scanning the plurality of acceptable cells comprises measuring a power parameter for each of the acceptable cells, and wherein selecting the cell from the plurality of acceptable cells with the highest power comprises selecting the cell with the greatest measurement for the power parameter.

41. The non-transitory machine-readable medium of claim 40, wherein the power parameter comprises a common pilot channel (CPICH) Ec/No value representing a received energy per chip divided by a power density in a band of a received CPICH signal.

42. The non-transitory machine-readable medium of claim 34, wherein the acceptable cells are associated with a plurality of service providers and each of the acceptable cells satisfy criterion for placing an emergency call in accordance with a third generation partnership project (3GPP) technical specification (TS) 25.304, versions 0.1.1 through 7.0.0.

43. The non-transitory machine-readable medium of claim 34, wherein placing the emergency call comprises sending a connection request for placing the emergency call to the selected cell.

44. The non-transitory machine-readable medium of claim 34, further comprising instructions that cause the machine to receive a connection reject message in response to sending a connection request message for placing the emergency call on a first cell, and wherein scanning the plurality of acceptable cells comprises scanning the plurality of acceptable cells in response to receiving the connection reject message.

45. A user equipment apparatus for reducing delay in placing an emergency call by a subscriber of a service provider in a wireless communication network, the apparatus comprising:

means for scanning a plurality of acceptable cells, wherein the acceptable cells include cells of the service provider and additional cells from one or more other service providers;

means for selecting a cell from the plurality of the acceptable cells, the selected cell having a highest power of the acceptable cells; and means for placing the emergency call on the selected cell, wherein the means for selecting the cell comprises means for acquiring the cell without ever performing a location update to place the emergency call, wherein the delay is reduced by reducing a number of failed attempts in placing the emergency call.

46. The apparatus of claim 45, wherein the means for selecting the cell includes means for transitioning wireless communication service from a first cell operating according to a first radio access technology (RAT) to the selected cell operating according to a second RAT different from the first RAT, and wherein the means for placing the emergency call includes means for placing the call according to the second RAT.

47. The apparatus of claim 46, wherein the first radio access technology is a code-division multiple access (CDMA) technology and the second radio access technology is a global system for mobile communications (GSM) technology.

48. The apparatus of claim 46, wherein the first RAT is a global system for mobile communications (GSM) technology and the second RAT is a code-division multiple access (CDMA) technology.

49. The apparatus of claim 45, wherein the means for selecting the cell includes means for transitioning wireless communication service from a first cell operating on a first frequency to the selected cell operating on a second frequency different from the first frequency, and wherein the means for placing the emergency call includes means for placing the emergency call on the second frequency.

50. The apparatus of claim 45, wherein the service provider is a first service provider, wherein the means for selecting the cell includes means for transitioning wireless communication service from a first cell associated with a first service provider to the selected cell associated with a second service provider different from the first service provider, and wherein the means for placing the emergency call includes means for placing the call on the selected cell associated with the second service provider.

51. The apparatus of claim 45, wherein the means for scanning the plurality of acceptable cells comprises means for measuring a power parameter for each of the acceptable cells, and wherein the means for selecting the cell from the plurality of acceptable cells with the highest power comprises means for selecting the cell with the greatest measurement for the power parameter.

52. The apparatus of claim 51, wherein the power parameter comprises a common pilot channel (CPICH) Ec/No value representing a received energy per chip divided by a power density in a band of a received CPICH signal.

53. The apparatus of claim 45, wherein the acceptable cells are associated with a plurality of service providers and each of the acceptable cells satisfy criterion for placing an emergency call in accordance with a third generation partnership project (3GPP) technical specification (TS) 25.304 specification, versions 0.1.1 through 7.0.0.

54. The apparatus of claim 45, wherein the means for placing the emergency call comprises means for sending a connection request for placing the emergency call to the selected cell.

55. The apparatus of claim 45, further comprising means for receiving a connection reject message in response to sending a connection request message for placing the emergency call on a first cell, and wherein the means for scanning the plurality of acceptable cells comprises means for scanning the plurality of acceptable cells in response to receiving the connection reject message.

\* \* \* \* \*